No. 683,485. Patented Oct. 1, 1901.
M. P. OSBOURN.
RUST JOINT.
(Application filed June 25, 1901.)
(No Model.)

WITNESSES:
Louis D. Heinrichs
P. M. Kelly

INVENTOR
Midard P. Osbourn
BY
atty.

UNITED STATES PATENT OFFICE.

MILLARD P. OSBOURN, OF CAMDEN, NEW JERSEY, ASSIGNOR TO WARREN WEBSTER AND COMPANY, OF NEW JERSEY.

RUST-JOINT.

SPECIFICATION forming part of Letters Patent No. 683,485, dated October 1, 1901.

Application filed June 25, 1901. Serial No. 65,924. (No model.)

*To all whom it may concern:*

Be it known that I, MILLARD P. OSBOURN, of the city and county of Camden, in the State of New Jersey, have invented an Improvement in Rust-Joints, of which the following is a specification.

My invention relates to rust-joints; and it consists of the improvements which are fully set forth in the following specification and shown in the accompanying drawings.

In rust-joints as they are commonly formed much difficulty is experienced in preventing the rust mixture from reaching the bolts or rivets and corroding them. It is usual to wind a strip of wicking about the exposed shanks of the bolts or rivets between the faces of the flanges and to pack the rust mixture about the wicking. Not only is it very difficult to prevent the rust mixture working about the wicking and reaching the bolts, but considerable difficulty is experienced in properly calking the space between the flanges, as the calking-tool works to a large extent against the yielding strands of wicking extending from one bolt to another and not against a solid backing. It results from this that the joints are often loosely packed and more or less of the rust mixture falls out of the joint, so that an imperfect union results.

It is the object of my invention to overcome these defects, first, by rendering it practically impossible for the rust mixture to come in contact with the bolts or rivets, and, second, by providing an unyielding backing for the rust mixture, so that the joint may be tightly calked. These objects I accomplish by arranging a longitudinal strip (preferably formed by abutting ribs on the faces of the flanges) between the two flanges inside of the bolt-holes and serving to divide the area between the flanges into two separated longitudinal spaces, through the outer of which the bolts or rivets extend and in the inner of which the rust material is packed. This longitudinal rib performs the dual function of forming a barrier to the passage of the rust mixture into the bolt-space and of presenting an unyielding backing for the rust mixture driven in by the calking-tool.

To prevent the rust mixture working loose and falling out of the calking-space, the faces of the flanges forming the calking-space may be inclined slightly toward one another to form a space of wedge-shaped cross-section.

Figure 1:
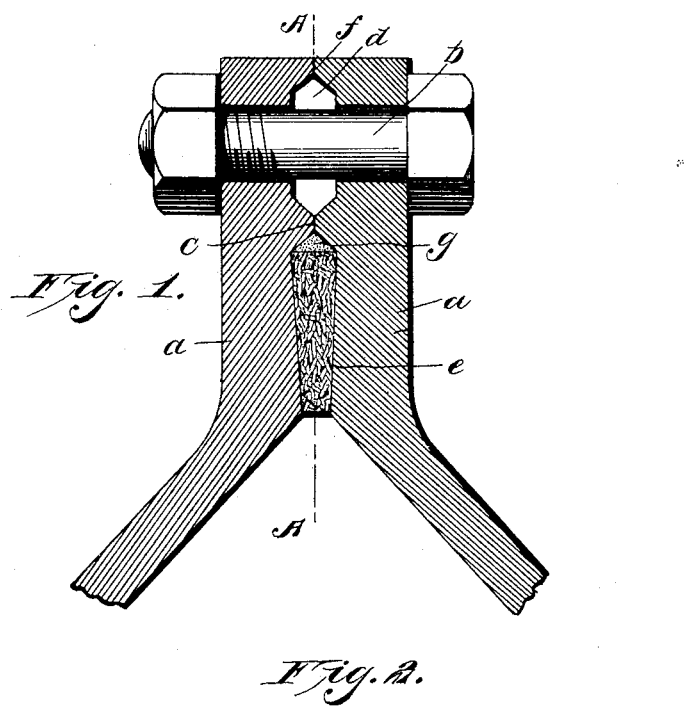
Figure 2:
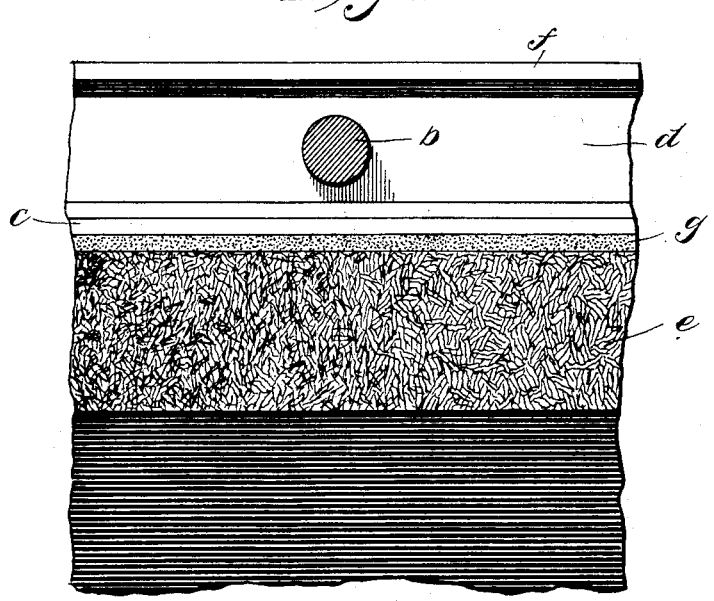

In the drawings, Figure 1 is a transverse sectional view of a rust-joint embodying my invention, and Fig. 2 is a longitudinal sectional view of the same on the line A A of Fig. 1.

$a$ $a$ are the two flanges or parts which are to be bolted together and united by the rust-joint. These flanges are provided with the usual bolt-holes and are bolted or riveted together by the bolts or rivets $b$ in the usual manner. The inner faces of the flanges are held out of contact by a longitudinal strip $c$, extending on the inside of the bolts and dividing the area between the flanges into two longitudinal spaces $d$ and $e$. The bolts $b$ extend through the outer longitudinal space $d$, and the inner space $e$ constitutes the calking-space for the rust mixture. The strip $c$ is preferably formed by longitudinal ribs upon the inner faces of the flanges, as shown, and similar ribs $f$ may be provided at the outer edges of the flanges outside of the bolts. The inner faces of the flanges inside of the strip $c$ are preferably inclined slightly toward one another, as shown, to give a slight wedge-shaped cross-section to the calking-space. This tends to hold the rust mixture in place and to prevent it working out. The usual longitudinal strip of wicking $g$, such as asbestos wick sized with red lead, is stretched longitudinally upon the strip $e$ in the calking-space and the rust mixture is forced in.

The strip $e$ effectively prevents the rust mixture passing into the space $d$ and reaching the bolts or rivets. It also acts as an unyielding backing for the rust mixture when driven in by the calking-tool.

The details of construction shown may be varied without departing from the invention.

What I claim as new, and desire to secure by Letters Patent, is as follows:

1. In a rust-joint the combination with the two flanges or parts to be united and the uniting bolts or rivets, of a metal strip extending longitudinally between the two flanges inside of the bolt-holes and serving to divide the area between the flanges into two separated longitudinal spaces.

2. In a rust-joint the combination with the two flanges or parts to be united and the uniting bolts or rivets, of a metal strip extending longitudinally between the two flanges inside of the bolt-holes and serving to divide the area between the flanges into two separated longitudinal spaces, a longitudinal strip of wicking extending along said metal strip on the inner space and a filling of rust mixture in said inner space.

3. In a rust-joint the combination with the two flanges or parts to be united and the uniting bolts or rivets, of a metal strip extending longitudinally between the two flanges inside of the bolt-holes and serving to divide the area between the flanges into two separated longitudinal spaces, the faces of the flanges inside of said dividing-strip inclining slightly toward one another and giving a wedge-shaped cross-section to the inner space.

4. In a rust-joint the combination of the two flanges or parts to be united provided on their inner faces with longitudinal abutting ribs located inside of the bolt-holes and forming a longitudinal strip dividing the area between the flanges into two separated longitudinal spaces, bolts or rivets uniting said flanges and extending through the longitudinal space outside of said dividing-strip, and a filling of rust mixture in the space on the inside of said strip.

In testimony of which invention I have hereunto set my hand.

MILLARD P. OSBOURN.

Witnesses:
AUGUST SEEMAN,
H. J. ARMINGTON.